Oct. 25, 1927.  
H. STOKESBERRY  
1,646,463  
PIPE COUPLING  
Filed May 8, 1925.
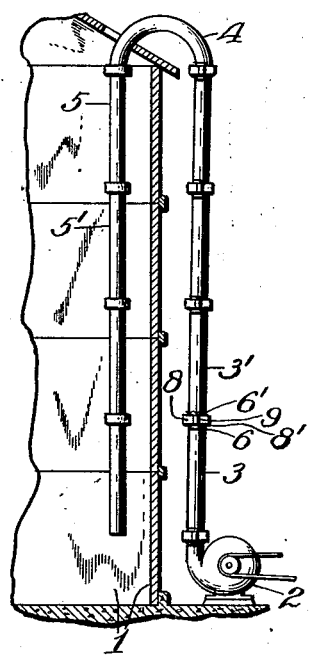
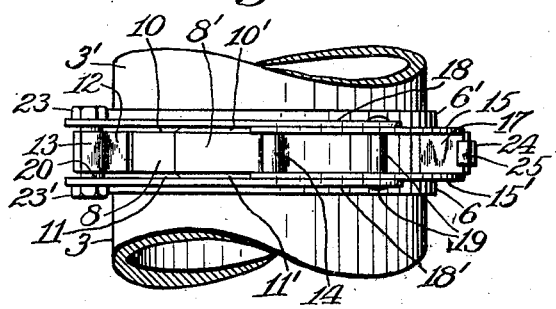
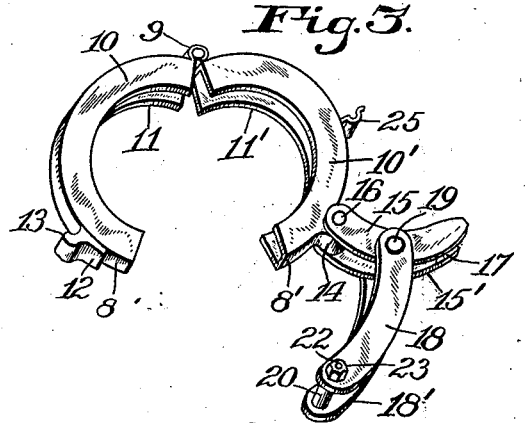
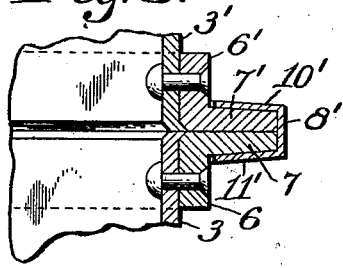
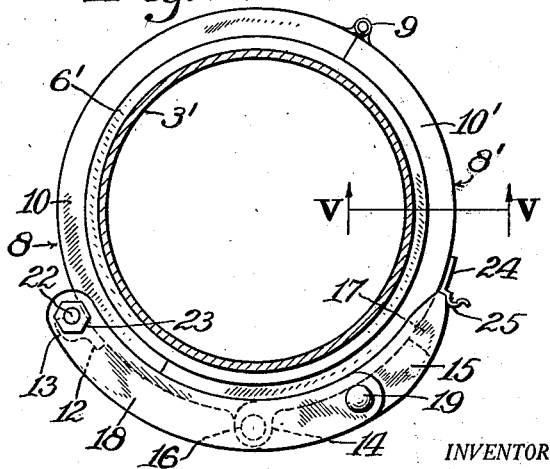
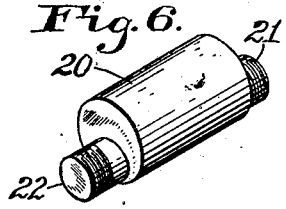
INVENTOR:  
Horace Stokesberry,  
BY  
E. D. Silvius,  
ATTORNEY.

Patented Oct. 25, 1927.

1,646,463

UNITED STATES PATENT OFFICE.

HORACE STOKESBERRY, OF GUILFORD TOWNSHIP, HENDRICKS COUNTY, INDIANA.

PIPE COUPLING.

Application filed May 8, 1925. Serial No. 28,952.

This invention relates to means for quickly coupling pipe sections together and permitting the sections to be quickly uncoupled, the invention having reference more particularly to a coupling for thin sheet metal pipes, such as those suitable for use in filling silos or in connection with strawstackers or blowers for various purposes.

An object of the invention is to provide an improved pipe coupling whereby pipe sections may be quickly connected together without requiring the use of bolts or similar devices that must be separately handled and are liable to become misplaced or lost, especially where the work must be done outdoors in the open.

Another object is to provide a pipe coupling which shall be so constructed as to permit reversibility of pipe sections so that either one of two ends of a section may be connected to either one of the ends of another section, permitting the sections to be brought together expeditiously.

A further object is to provide an improved pipe coupling of such construction as to permit pipe sections to be connected together without requiring the use of any tool and without the assistance of a helper, so that the pipe sections may be rapidly connected together to set up a line of pipe and permit the disassembling of the piping in a rapid manner and therefore economically, especially when piping is required for use only a short time in each situation.

With the above-mentioned and other objects in view, the invention consists in an improved "snap" type of coupling device adapted to clamp two co-operating pipe flanges together, the invention consisting further in the parts and combinations and arrangements of parts as hereinafter particularly described and definitely claimed.

Referring to the drawings,—Figure 1 is a fragmentary vertical section of a silo with which the invention is associated to illustrate one of the purposes and advantages of the invention; Fig. 2 is a fragmentary external view of two pipe sections connected together by means of the improved coupling; Fig. 3 is a perspective view of the clamping apparatus of the coupling; Fig. 4 is a top plan of Fig. 2; Fig. 5 is a fragmentary section on an enlarged scale on the line V—V in Fig. 4; and Fig. 6 is a perspective view of an adjustable connector part of the clamping apparatus.

Similar reference characters in the various figures of the drawings indicate corresponding elements or features of construction herein referred to in detail.

In the drawings the numeral 1 indicates a silo, 2 a suitable blower adapted for forcing silage, 3 and 3' indicating sections of the pipe line connected to the blower and extending upward outside the silo and to which a return elbow 4 is connected, the elbow extending into the upper portion of the silo and having a pipe line connected thereto and extending downward inside the silo as customarily, being composed of sections 5, 5' that are flexible and detachably connected together, the lower sections being detached and removed as the silage accumulates in the silo.

The pipe sections 3, 3' are each composed of sheet metal, such as galvanized iron, so as to not be heavy, the sections being of convenient length so as to be easily handled and suitable for making a pipe line of greater or less extent as may be required, and for the purposes of the invention substantial metallic collars 6 and 6' are provided and securely fastened on the sections adjacent to the opposite ends thereof, the collars having opposed pipe flanges 7 and 7' thereon respectively, each flange being faced to form close contact with another, the outer faces of the flange being slightly inclined relatively to the opposite joint face, so that the two flanges together are slightly wedge-shaped in cross section and afford facilities for forcing the two flanges tightly together.

The improved clamping apparatus comprises a sectional band composed of two curved metallic parts 8 and 8' connected together at one end by means of a hinge 9. The band parts have curved clamping members 10 and 10' on one edge and similar members 11 and 11' respectively on the opposite edge thereof, the two opposite members being transversely divergent from the band part to closely embrace the pipe flanges and draw them tightly together. One band part has an anchor plate 12 rigidly connected to the outer side thereof in proximity to the swinging end of the part, the plate having a curved lug 13 integral therewith. The opposite band part has an ear 14 rigidly connected to the outer side thereof adjacent to its swinging end, and two curved lever arms 15 and 15' are connected at one end to the ear by means of a pivot pin 16, an end block 17 being rigidly connected to the arms adjacent to their opposite ends. The lever could be composed of a single arm if desired instead of the two arms as specified. A yoke is provided which preferably comprises two curved links or side bars 18 and 18' connected at one end to the outer sides of the lever arms by means of a pivot pin 19, the opposite ends of the links having a suitable connector portion adapted to be brought into engagement with the lug 13 whereby to draw the swinging ends of the band parts together, the connecter portion preferably being composed of a bolt or pin 20 arranged between the links or side bars and having relatively eccentric bolt ends 21 and 22 arranged in suitable holes and extending through the links or bars and provided respectively with nuts 23 and 23', providing for adjustment of the bolt rotatively to vary the effective length of the yoke. Normally the end block 17 of the clamping lever rests against the outer side of the band part 8', the lever arms overlapping the members 10' and 11' and ordinarily are maintained in place because of the tension on the lever, the pivot pin 16 being arranged slightly farther outward relatively to the band part 8' than the pivot pin 19. To guard against accidental shifting of the clamping lever from its normal position, a latch for the lever preferably is provided which may comprise an anchor plate 24 rigidly connected to the outer side of the band part 8' and having an elastic catch finger 25 thereon to engage the end block 17 when the lever is forced into connection with the finger.

In practical use the pipe sections are arranged end to end, the flanges 7 and 7' on two contiguous sections being brought together, after which the clamping appliance, being opened as in Figure 3, is readily placed on the pipe flanges and closed thereon so as to permit the bolt 20 to be connected with the lug 13 which is permitted when the clamping lever is swung outward or towards the lug. Having connected the yoke to the lug, the clamping lever is swung around towards its normal position and causes the pipe flanges to be tightly gripped by the clamping members of the coupling band, the lever being further forced inward to the part 8' and latched. In case the yoke is too long or too short it is readily adjusted as to length after slackening the nuts 23 and 23', turning the bolt and again tightening the nuts. When it is desired to disconnect the pipe sections the operation is readily effected by reverse operation of the clamping apparatus, as is apparent, without loss of time or manual energy.

What is claimed as new is:

1. In a pipe coupling, the combination of a pair of curved clamp band parts hinged together at one end, one of the pair of parts having a lug adjacent to the opposite end thereof, the other one of the pair of parts having an ear adjacent to the opposite end thereof, a lever pivoted at one end to the ear, and a yoke pivoted at one end to the lever and having an eccentric bolt adjustably connected thereto at the opposite end thereof to be connected to said lug.

2. In a pipe coupling, the combination of a curved clamp band part having a radial lug thereon adjacent to one end thereof, the concave portion of the part having opposed clamping members, a curved clamp band part having a radial ear thereon adjacent to one end thereof and also a radial latch finger spaced apart from the ear, the concave portion of the part having opposed clamping members, a hinge connected to the opposite ends of the band parts, a curved lever pivoted at one end thereof to said ear and pivotally movable into connection with said latch finger, a pair of curved link bars pivotally connected at one end thereof to the opposite sides of said lever, the link bars being movable to carry the opposite end portions thereof to opposite sides respectively of said lug, and an eccentric bolt adjustably secured to said opposite end portions of the link bars to variably engage said lug.

3. In a pipe coupling, the combination with a curved clamp band part and a lug thereon, a curved clamp band part and an ear thereon, and a hinge connecting the parts together, of a pair of lever arms pivotally connected at one end to said ear and normally engaging the opposite sides of said clamp part, the opposite ends of said arms having and end block engaging the outer side of said band part, a curved yoke pivoted to the lever arms and normally extending to said lug, and a pin having an eccentric portion between its ends adjustably connected to the yoke, to variably engage said lug.

In testimony whereof, I affix my signature on the 30th day of April, 1925.

HORACE STOKESBERRY.